United States Patent
Pfadler et al.

(10) Patent No.: US 11,844,004 B2
(45) Date of Patent: Dec. 12, 2023

(54) METHOD, COMPUTER PROGRAM, APPARATUS, VEHICLE AND NETWORK COMPONENT FOR CONTROLLING A COMMUNICATION LINK USED FOR TELE-OPERATING A VEHICLE

(71) Applicant: VOLKSWAGEN AKTIENGESELLSCHAFT, Wolfsburg (DE)

(72) Inventors: Andreas Pfadler, Berlin (DE); Guillaume Jornod, Berlin (DE)

(73) Assignee: Volkswagen Aktiengesellschaft ( * ) Notice: Subject to any disclaimer, the term of this patent is extended or adjusted under 35 U.S.C. 154(b) by 449 days.

(21) Appl. No.: 17/330,833

(22) Filed: May 26, 2021

(65) Prior Publication Data
US 2021/0377707 A1 Dec. 2, 2021

(30) Foreign Application Priority Data

May 28, 2020 (EP) .................................. 20177022

(51) Int. Cl.
H04W 28/24 (2009.01)
H04W 4/40 (2018.01)
H04W 28/08 (2023.01)
G01C 21/34 (2006.01)
H04W 84/18 (2009.01)

(52) U.S. Cl.
CPC .......... *H04W 4/40* (2018.02); *G01C 21/3469* (2013.01); *H04W 28/0967* (2020.05); *H04W 28/24* (2013.01); *H04W 84/18* (2013.01)

(58) Field of Classification Search
CPC ... H04W 4/40; H04W 28/0967; H04W 28/24; H04W 84/18; G01C 21/3469
See application file for complete search history.

(56) References Cited

U.S. PATENT DOCUMENTS

| 8,938,353 B2 | 1/2015 | Patel et al. |
| 9,494,935 B2 | 11/2016 | Okumura et al. |
| 10,243,860 B2 | 3/2019 | Szilágyi et al. |

(Continued)

FOREIGN PATENT DOCUMENTS

EP 3723412 A1 10/2020

OTHER PUBLICATIONS

Hetzer et al.; 5G Connected and Automated Driving: Use Cases and Technologies in Cross-border Environments; 2019 European Conference on Networks and Communications (EuCNC); IEEE Jun. 18-21, 2019; Valencia, Spain.

(Continued)

*Primary Examiner* — Mathew Franklin Gordon
(74) *Attorney, Agent, or Firm* — BARNES & THORNBURG, LLP

(57) ABSTRACT

A method, a computer program, an apparatus, a transportation vehicle, and a network component for controlling a communication link used for tele-operating a transportation vehicle. The method includes obtaining information related to a predicted quality of service (pQoS) for the communication link between the transportation vehicle and a tele-operator of the transportation vehicle and selecting an operating mode for tele-operating the transportation vehicle from a group of operating modes based on the information related to the pQoS, the group of operating modes having two or more operating modes differing at least in a speed limit for the transportation vehicle.

25 Claims, 4 Drawing Sheets

(56) References Cited

U.S. PATENT DOCUMENTS

| | | |
|---|---|---|
| 10,349,285 B1 | 7/2019 | Rao |
| 10,446,037 B2 | 10/2019 | Kentley-Klay et al. |
| 2017/0182664 A1 | 6/2017 | Watts |
| 2020/0107212 A1 | 4/2020 | Zielinski et al. |

OTHER PUBLICATIONS

Huawei; New Key Issue and Solution for Dynamic Application Adjustment; SA WG2 Meeting #128Bis; Aug. 20-24, 2018; Sophia Antipolis, France.
Huawei; eNESQO TR: Predictive CoS Areas of Improvement; 5GAA Working Group 2 Meeting; 13th WG Brussels Meeting; Feb. 3-5, 2020.
Pfadler et al.; Predictive Quality of Service: Adaptation of Platoon Inter-Vehicle Distance to Packet Inter-Reception Time; 2020 IEEE 91st Vehicular Technology Conference (VTC2020-Spring); IEEE; May 25-28, 2020.
Fifth Generation Cross-Border Control; downloaded from http://5gcroco.eu prior to May 28, 2020.
TSG SA Meeting #SP-80; LS to 3GPP on CoS Prediction; Jun. 13-15, 2018; La Jolla, California.
Search Report for European Patent Application No. 20177022.9; dated Nov. 19, 2020.

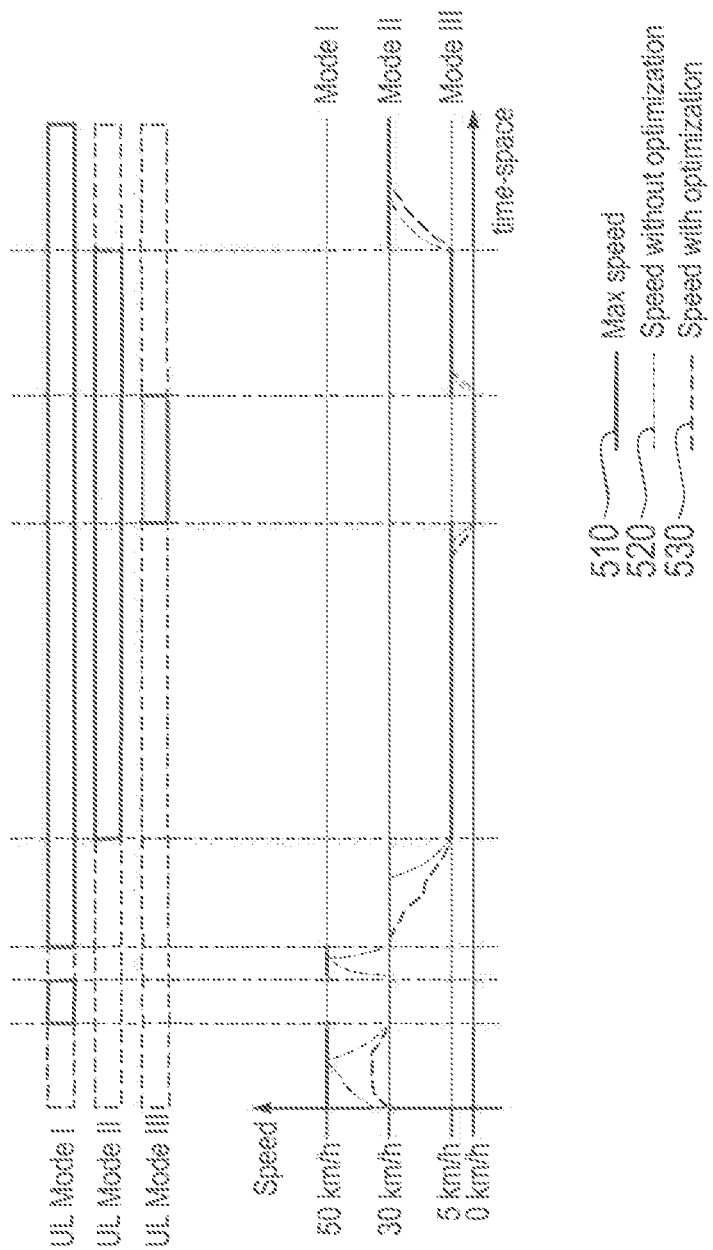

METHOD, COMPUTER PROGRAM, APPARATUS, VEHICLE AND NETWORK COMPONENT FOR CONTROLLING A COMMUNICATION LINK USED FOR TELE-OPERATING A VEHICLE

PRIORITY CLAIM

This patent application claims priority to European Patent Application No. 20177022.9, filed 28 May 2020, the disclosure of which is incorporated herein by reference in its entirety.

SUMMARY

Illustrative embodiments relate to a method, a computer program, an apparatus, a transportation vehicle, and a network component for controlling a communication link used for tele-operating a transportation vehicle, more specifically, but not exclusively, to a concept for selecting among different operating modes for tele-operated driving based on a predicted quality of service for a controlling communication link.

BRIEF DESCRIPTION OF THE DRAWINGS

Disclosed embodiments will be described with reference to the accompanying figures, in which:

FIG. 5 shows a possible speed progress depending on a communication quality in an exemplary embodiment.

DETAILED DESCRIPTION

Figure 1:
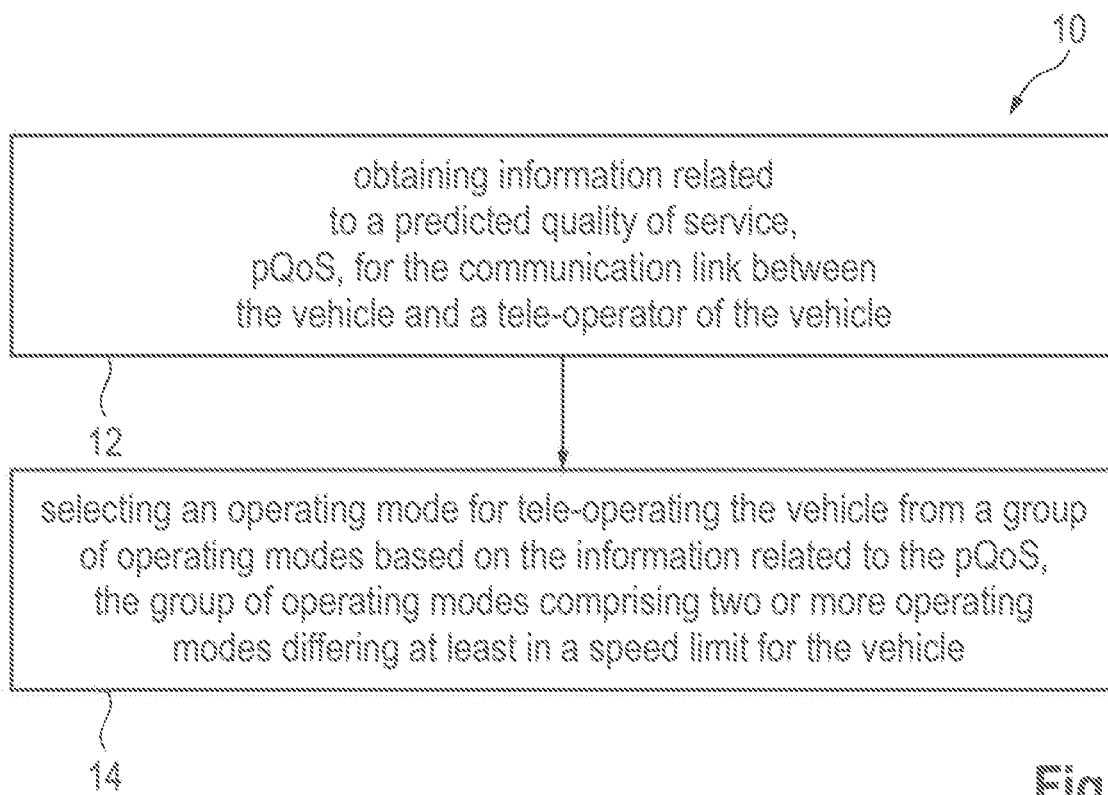
FIG. 1 illustrates a block diagram of an exemplary embodiment of a method for controlling a communication link used for tele-operating a transportation vehicle.

Vehicular communication is a field of research and development. To enable autonomous or semi-autonomous driving of transportation vehicles, transportation vehicles are expected to use Vehicle-to-Vehicle-communication (V2V) and Vehicle-to-Network (V2N) communication, e.g., to coordinate driving maneuvers and/or to receive tele-operated driving instructions. This communication is generally wireless, i.e., transportation vehicles may wirelessly communicate with other transportation vehicles in their vicinity and/or with backend services via cellular mobile communication systems.

Tele-operated driving (ToD) is getting more and more interest. The main concept of ToD is an automated vehicle (AV) remotely driven by a control/command center (CC). CC and AV may be far away from each other. They are connected via a radio communication system (e.g., 4th, 5th Generation mobile communication systems (4G, 5G)) and its backhaul. Therefore, a certain end-to-end (E2E) delay and data rate are to be expected. The CC controls the automated vehicle (AV) via remote control. In direct control the CC directly controls one or more actuators of the AV.

For example, 5GCroCo will trial 5G technologies in the cross-border corridor along France, Germany and Luxembourg. In addition, 5GCroCo also aims at defining new business models that can be built on top of this unprecedented connectivity and service provisioning capacity. Further information can be found on the Internet at 5gcroco.eu.

Document U.S. Pat. No. 10,446,037 B2 relates to autonomous vehicles and associated mechanical, electrical and electronic hardware, computer software and systems, and wired and wireless network communications to provide an autonomous vehicle fleet as a service. In particular, a method may include receiving, from a user device, a ride request to transport a user to a destination from an origin location through an autonomous vehicle system service. Based on the origin location associated with the request, an autonomous vehicle system may be selected from a fleet of autonomous vehicles to execute the ride request. The fleet may be managed by the autonomous vehicle system service. The ride request may then be provided to the autonomous vehicle system, and information about the autonomous vehicle system may also be provided to the user device.

Document US 2020/0107212 A1 concerns a method for predicting a quality of service for a communication about at least one communication link of at least one communication device. QoS prediction may be necessary when it comes to the case that a user wants to use an application where a certain type of QoS is a presumption. For getting the best estimate of the quality of service the method comprises the operation of sending from the communication device a quality of service prediction request message hereinafter called QoS prediction request message to a communication service prediction server, predicting the quality of service in the communication service prediction server and sending back a quality of service prediction response message to the communication device. The communication device can thus decide if the predicted QoS is sufficient for the planned activity and may take a decision to either start the activity, postpone the activity, or alter the activity.

Document U.S. Pat. No. 10,243,860 B3 provides dynamic and adaptive QoS and QoE (Quality of Experience) management of U-Plane traffic while implementing user and application specific differentiation and maximizing system resource utilization by, for example, utilizing a system comprised of a policy server and one or more enforcement points. In one example system, the policy server may be a logical entity configured for storing a plurality of QoS/QoE policies, each of the plurality of policies identifying at least one of a user, service vertical, application, or context, and associated QoE targets. The policy server may be further configured to provide one or more of the plurality of QoS/QoE policies to the one or more enforcement points. In some disclosed embodiments, the QoS/QoE policies may be configured to provide QoE targets, for example, at a high abstraction level and/or at an application session level.

Document "Predictive Quality of Service: Adaptation of Platoon Inter-Vehicle Distance to Packet Inter-Reception Time", PFADLER ANDREAS ET AL, provides a concept for platooning and cooperation of automated vehicles. The document proposes to adapt the speed of a vehicle, depending on the pQoS and the mobility of the vehicular environment.

Document "New Key Issue and Solution for Dynamic Application Adjustment", HUAWEI ET AL, discloses a concept for eV2X services and proposes to dynamically and timely adjust an eV2X application if a QoS degrades, by lowering the speed of a car, increasing an inter-car distance, or changing a level of automation.

Document "L8 to 3GPP on 008 Prediction", 5GAA WG2, relates to a concept for prediction of quality of service and End-to-End Network Slicing for Automotive Use Cases. The document also proposes to slow-down a remote driven vehicle in case of network QoS prediction changes.

Document "SG Connected and Automated Driving: Use Cases and Technologies in Cross-border Environments", HETZER DIRK ET AL, relates to a concept for 5G connected and automated driving. The document also proposes to reduce speed, change the route, or safely stop a car when degradation of QoS is expected.

There is a demand for an improved concept for controlling ToD.

Disclosed embodiments are based on the finding that ToD control performance is linked to communication link performance. For example, latency and data rate performance of a communication link between a CC/tele-operator and a tele-operated transportation vehicle contribute significantly to a reaction time of the transportation vehicle. In the uplink, i.e., the communication link from the transportation vehicle to the CC, there are communication latencies involved between data acquisition at the transportation vehicle (e.g., video and other sensing) and data presentation (e.g., video display). The tele-operator hence reacts to delayed data and issues a control command, which undergoes further communication delay when being communicated to the transportation vehicle in the downlink (from the CC to the transportation vehicle). To avoid safety risks, the speed limit of the transportation vehicle should be the lower the higher the communication delays. It is a finding of exemplary embodiments that the speed limit for a remote operated transportation vehicle can be set by predefining a group of ToD operation modes to select from. The group of operating modes comprises two or more operating modes differing at least in a speed limit for the transportation vehicle. Selecting from a predefined group may enable a more efficient control in ToD.

Disclosed embodiments provide a method for controlling a communication link used for tele-operating a transportation vehicle. The method comprises obtaining information related to a predicted quality of service, pQoS, for the communication link between the transportation vehicle and a tele-operator of the transportation vehicle. The method further comprises selecting an operating mode for tele-operating the transportation vehicle from a group of operating modes based on the information related to the pQoS. The group of operating modes comprises two or more operating modes differing at least in a speed limit for the transportation vehicle. Disclosed embodiments enable an efficient control over ToD operational settings using a predetermined group or set of operational modes.

For example, the information related to the pQoS may comprise at least latency and data rate. Disclosed embodiments may consider impairments that may occur in a combined (radio and non-radio) communication link.

At least in some exemplary embodiments the method may further comprise determining an allowable speed limit based on the information related to the pQoS and selecting the operating mode based on the allowable speed limit for the transportation vehicle. Based on, for example, latency and data rate on the control link a speed limit can be determined and an according operational mode can be assigned.

Each of the operating modes may be assigned to a QoS requirement. A certain QoS requirement may be necessary to tele-operate a transportation vehicle in a certain operational mode.

The method may further comprise adapting to a selected operating mode based on a cost function. Disclosed embodiments may take into account a cost of mode adaptions.

For example, the cost function may relate to an efficiency of an operating mode. Hence, exemplary embodiments may consider an operating efficiency in ToD. The cost function may relate an operating mode change to fuel efficiency and comfort. Comfort and fuel efficiency may be considered in exemplary embodiments.

In some exemplary embodiments the method may further comprise monitoring the information related to pQoS and re-selecting the operation mode based on a monitored pQoS. Disclosed embodiments may enable pQoS adapted ToD.

Furthermore, a current QoS on the communication link may be monitored. Disclosed embodiments may hence enable safe ToD by monitoring current QoS and future QoS trends. For example, the method may comprise reselecting the operating mode in case the current QoS falls below a threshold required for a current operating mode.

The method may further comprise triggering a safety stop of the transportation vehicle in case the current QoS falls below a safety threshold. Disclosed embodiments prioritize safety by triggering a safety stop in case of communication link impairments.

Disclosed embodiments further provide a computer program having a program code for performing one or more of the described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Another exemplary embodiment is an apparatus for controlling a communication link used for tele-operating a transportation vehicle. The apparatus comprises one or more interfaces configured to communicate in a communication network and a control module configured to control the one or more interfaces. The control module is further configured to perform one of the methods described herein. Further exemplary embodiments are a transportation vehicle comprising the apparatus and a network component comprising the apparatus.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular exemplary embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of an exemplary embodiment of a method 10 for controlling a communication link used for tele-operating a transportation vehicle. The method 10 comprises obtaining 12 information related to a predicted quality of service, pQoS, for the communication link between the transportation vehicle and a tele-operator of the transportation vehicle. The method 10 further comprises selecting 14 an operating mode for tele-operating the transportation vehicle from a group of operating modes based on the information related to the pQoS. The group of operating modes comprises two or more operating modes differing at least in a speed limit for the transportation vehicle.

In exemplary embodiments the speed limit is the maximum speed that the transportation vehicle can drive while being tele-operated. The method 10 may further comprise applying the speed limit to the transportation vehicle while being tele-operated. Tele-operating the transportation vehicle is to be understood as a remote operation of the transportation vehicle. For example, a remote operator or tele-operator located at a CC takes over control of the transportation vehicle by control commands (e.g., acceleration/deceleration commands, steering commands, etc.). Tele-operated driving (ToD) might become a key technology to solve issues with L4/L5 (L4: highly automatic, L5: fully automatic) driven transportation vehicles, such as interpretation issues or deadlocks (situations, which cannot be resolved by autonomous or automatic control mechanisms only).

These issues occur when automatic driven vehicles (AV) are not able to interpret and to solve a situation due to not clear traffic conditions, e.g., an accident or a construction site. These transportation vehicles may need external instructions from someone else to solve the situation, which can be the so-called control center (CC). A ToD transportation vehicle will be driven remotely by the CC (an operator therein) in what is called a ToD session.

The ToD performance is related to the communication link performance. The communication link may comprise a wireless part and wired part and the pQoS may relate at least to the wireless part in some exemplary embodiments. For example, the communication link comprises the air interface (Uu link in 3GPP (3rd Generation Partnership Project), wireless part of the communication link) between the transportation vehicle and the base station (access node) and then the connection through the operator backbone (core network, wired part). Depending on the quality of the link, the control of the transportation vehicle will be adapted in exemplary embodiments: the transportation vehicle will be controlled directly (joystick-like) or indirectly (waypoints, or environmental model editions). The environment may be characterized by the type of road, e.g., highway, country road, city road, residential area road, number of lanes, traffic density, traffic dynamics, etc. Moreover, the time of day, the day of week, the weather, current traffic condition/density; and other factors may be comprised in the information related to the environment of the tele-operated transportation vehicle.

Disclosed embodiments may provide a selection of an operating mode, which comprises a remote-control maximal speed definition, based on pQoS and transportation vehicle environment. Two main factors are crucial for the determination of the driving speed of the AV in a ToD session. The first is predictive quality of service (pQoS), e.g., the future data rate and even more important latency. The pQoS may comprise at least latency and data rate. In exemplary embodiments QoS or pQoS may comprise one or more elements of the group of, latency, data rate, error rate/reliability, packet error rate, packet inter-reception time, etc. Such QoS may depend on different factors, e.g., the radio access technology (RAT), pathloss, environment, interference situation, load, processing delay, etc.

QoS may negatively affect the control of the transportation vehicle and as a consequence the speed of the AV needs to be adapted. The second influence factor is the AV environment and the required reaction time, which is needed for the remote controlling from the CC to the AV. E.g., a remotely driven AV located in a downtown area and surrounded by moving humans does not allow as much latency as a transportation vehicle driving on an abandoned street. For example, in an exemplary embodiment the method 10 may comprise determining an allowable speed limit based on the information related to the pQoS and selecting the operating mode based on the allowable speed limit for the transportation vehicle. Each of the operating modes may be assigned to a QoS requirement.

Figure 2:
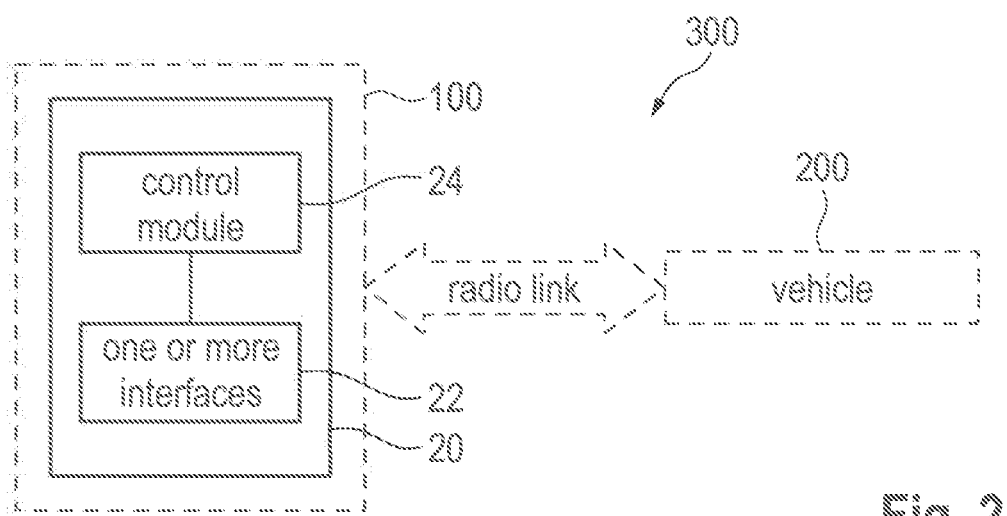
FIG. 2 shows a block diagram of an exemplary embodiment of an apparatus for controlling a communication link used for tele-operating a transportation vehicle, an exemplary embodiment of a transportation vehicle, and an exemplary embodiment of a network component.

FIG. 2 illustrates a block diagram of an exemplary embodiment of an apparatus 20 for controlling a communication link used for tele-operating a transportation vehicle, an exemplary embodiment of a transportation vehicle 100, and an exemplary embodiment of a network component 100. As shown in FIG. 2 the apparatus 20 for controlling the communication link used for tele-operating the transportation vehicle comprises one or more interfaces 22 configured to communicate in a communication network. The apparatus 20 further comprises a control module 24, which is configured to control the one or more interfaces 22, and which is coupled to the one or more interfaces 22. The control module 24 is further configured to perform one of the methods 10 described herein. As further shown in FIG. 2 in broken lines (as optional from the perspective of the apparatus 20), an entity 100 comprising an exemplary embodiment of the apparatus 20 is another disclosed embodiment. Such entity 100 may be a transportation vehicle or a network component (e.g., a server, a computer, a base station, hardware, CC, etc.) FIG. 2 further illustrates the radio link for controlling a ToD transportation vehicle 200.

The apparatus 20 and the transportation vehicle or network component 100 may communicate at least partly through a mobile communication system. The mobile communication system, may, for example, correspond to one of the Third Generation Partnership Project (3GPP)-standardized mobile communication networks, where the term mobile communication system is used synonymously to mobile communication network. The messages (input data, control information) may hence be communicated through multiple network nodes (e.g., internet, router, switches, etc.) and the mobile communication system, which generates the delay or latencies considered in exemplary embodiments. For example, the uplink direction refers to the direction from a transportation vehicle to the command center and the downlink direction refers from the command center to the transportation vehicle.

The mobile or wireless communication system may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver, a relay station or a UE, e.g., coordinating service provision in a cluster or group of multiple UEs/vehicles. A base station transceiver can be operable or configured to communicate with one or more active mobile transceivers/vehicles and a base station transceiver can be located in or adjacent to a coverage area of another base station transceiver, e.g., a macro cell base station transceiver or small cell base station transceiver. Hence, disclosed embodiments may provide a mobile communication system comprising two or more mobile transceivers/vehicles 200 and one or more base station transceivers, wherein the base station transceivers may establish macro cells or small cells, as, e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a transportation vehicle, a road participant, a traffic entity, traffic infrastructure etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a gNodeB, a Base Transceiver Station (BTS), an access point, a remote radio head, a relay station, a transmission point, etc., which may be further subdivided in a remote unit and a central unit.

A mobile transceiver or transportation vehicle can be associated with a base station transceiver or cell. The term cell refers to a coverage area of radio services provided by a base station transceiver, e.g., a NodeB (NB), an eNodeB (eNB), a gNodeB, a remote radio head, a transmission point, etc. A base station transceiver may operate one or more cells on one or more frequency layers, in some exemplary embodiments a cell may correspond to a sector. For example, sectors can be achieved using sector antennas, which provide a characteristic for covering an angular section around a remote unit or base station transceiver. A base station transceiver may operate multiple sectorized antennas. In the following, a cell may represent an according base station transceiver generating the cell or, likewise, a base station transceiver may represent a cell the base station transceiver generates.

The apparatus 20 may be comprised in a server, a control center, a base station, a NodeB, a UE, a transportation vehicle, a network component, a relay station, or any service coordinating network entity in exemplary embodiments. It is to be noted that the term network component may comprise multiple sub-components, such as a base station, a server, etc.

In exemplary embodiments the one or more interfaces 22 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 22 may comprise further components to enable according communication in the (mobile) communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 22 may be coupled to one or more antennas, which may correspond to any transmit and/or receive antennas, such as horn antennas, dipole antennas, patch antennas, sector antennas etc. In some examples the one or more interfaces 22 may serve the purpose of transmitting or receiving or both, transmitting and receiving, information, such as information, input data, control information, further information messages, etc.

As shown in FIG. 2 the respective one or more interfaces 22 are coupled to the respective control module 24 at the apparatus 20. In exemplary embodiments the control module 24 may be implemented using one or more processing units, one or more processing devices, any method or mechanism for processing, such as a processor, a computer or a programmable hardware component being operable with accordingly adapted software. In other words, the described functions of the control module 24 may as well be implemented in software, which is then executed on one or more programmable hardware components. Such hardware components may comprise a general-purpose processor, a Digital Signal Processor (DSP), a micro-controller, etc.

In exemplary embodiments, communication, i.e., transmission, reception or both, may take place among mobile transceivers/vehicles 100 directly, e.g., forwarding input data or control information to/from a control center. Such communication may make use of a mobile communication system. Such communication may be carried out directly, e.g., by Device-to-Device (D2D) communication. Such communication may be carried out using the specifications of a mobile communication system. An example of D2D is direct communication between transportation vehicles, also referred to as Vehicle-to-Vehicle communication (V2V), car-to-car, Dedicated Short Range Communication (DSRC), respectively. Technologies enabling such D2D-communication include 802.11p, 3GPP systems (4G, 5G, NR and beyond), etc.

In exemplary embodiments, the one or more interfaces 22 can be configured to wirelessly communicate in the mobile communication system, e.g., in an exemplary embodiment in which the apparatus 20 is implemented in a transportation vehicle 100 and the method 10 is carried out at the transportation vehicle 100. To do so, radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc. For example, in direct Cellular Vehicle-to-Anything (C-V2X), where V2X includes at least V2V, V2-Infrastructure (V2I), etc., transmission according to 3GPP Release 14 onward can be managed by infrastructure (so-called mode 3) or run in a UE. To determine a speed limit in an exemplary embodiment for a tele-operated transportation vehicle 200, it may be critical to predict the QoS in the communication network.

In exemplary embodiments, to operate remote control, data are exchanged through a cellular network. The quality of the uplink (perception data) and downlink (control data) connection, QoS, has a dramatic impact on the quality of application (QoA). The most important key performance indicators (KPIs) for tele-operations are latency and data rate of the communication network, e.g., a 4G network. Therefore, different ToD modes with distinct communication requirements are possible, i.e., latency and data rate. For each mode a certain speed limit is given. It is possible to have modes with lower data rate consumption, e.g., using a reduction of the frame rate of the video upstream. The trade-off of such modes is that the speed of the transportation vehicle needs to be reduced. It is also possible to increase the maximum value requirement for the latency, i.e., higher latency is then tolerable by switching from direct control to indirect control in the DL.

Disclosed embodiments may select a mode in UL and DL, depending on the prediction of communication quality, pQoS. Inefficient mode switching may be avoided, depending on the prediction communication quality and each mode switch may be communicated with the CC. Disclosed embodiments may also react if the current communication quality requirement is infringed, e.g., by switching/selecting another mode or by effecting a safety stop maneuver.

Figure 3:
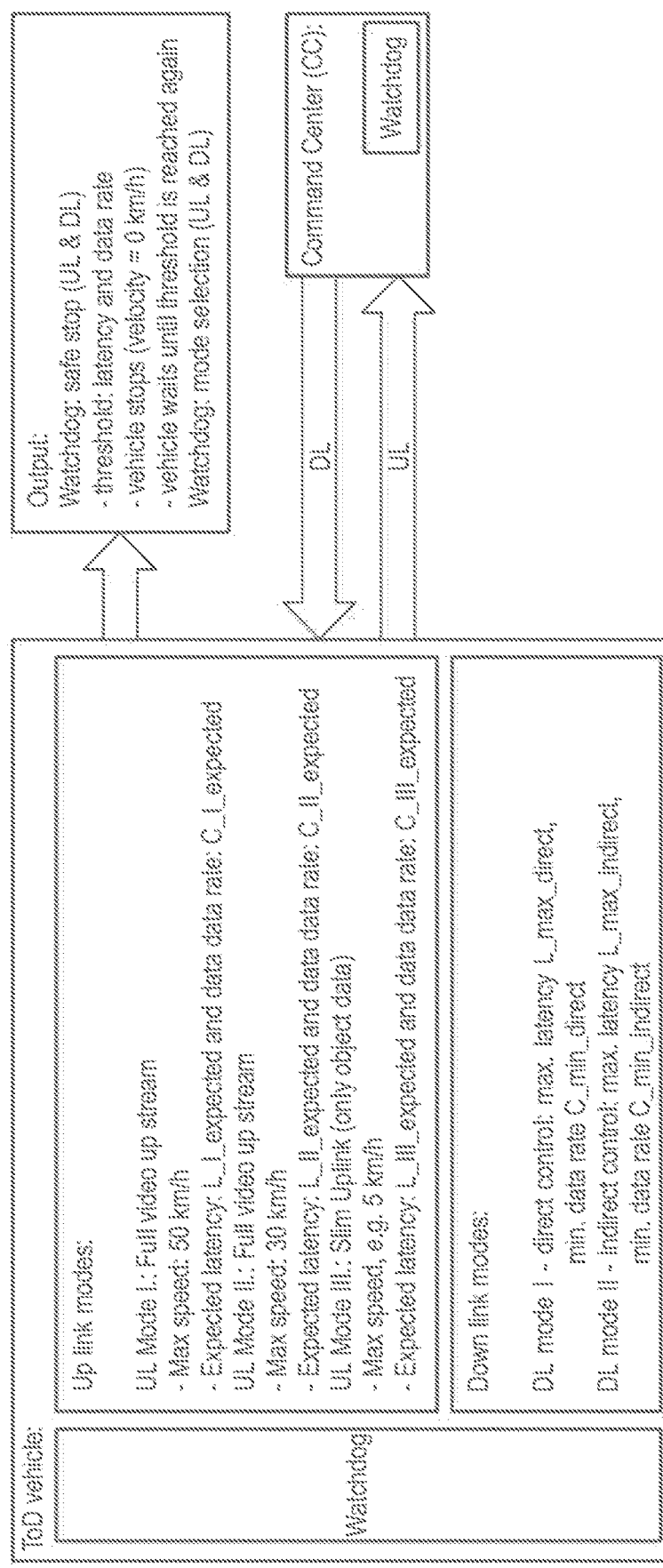
FIG. 3 depicts an overview of ToD modes in an exemplary embodiment.

FIG. 3 depicts exemplary modes in the UL and two control modes in the DL as an overview of an exemplary embodiment. The operating modes are depicted on the left and the above described method 10 is implemented as a watchdog service monitoring the operating modes. As shown in FIG. 3 there are three UL Modes, UL Mode I, UL Mode II, and UL Mode III.

UL Mode I uses a full video up stream, a maximum speed of 50 km/h together with an expected latency L_I_expected, and an expected data rate of C_I_expected.

UL Mode II uses a lower video up stream than UL Mode I, a maximum speed of 30 km/h together with an expected latency L_II_expected, and an expected data rate of C_II_expected.

UL Mode III uses a slim UL (only object data), a maximum speed of 5 km/h together with an expected latency L_III_expected, and an expected data rate of C_III_expected.

Moreover, there are two DL modes, DL mode I and DL mode II. DL mode I uses direct control, defines a maximum latency L_max_direct and a minimal data rate C_min_indirect. DL mode II uses indirect control, defines a maximum latency L_max_indirect and a minimal data rate C_min_indirect. As further shown in FIG. 3 the transportation vehicle communicates via UL and DL with the CC shown on the left, which also utilizes a watchdog method.

In this exemplary embodiment the method 10 is implemented as watchdog application which may have different outputs. In this exemplary embodiment, the method 10 further comprises monitoring a current QoS on the communication link. The method 10 may comprise reselecting the operating mode in case the current QoS falls below a threshold required for a current operating mode. For example, a safe stop may be triggered by according UL and/or DL thresholds with respect to latency and data rate. The method 10 comprises triggering a safety stop of the transportation vehicle in case the current QoS falls below a safety threshold (for latency, data rate, or both). The transportation vehicle may then stop or wait until the QoS reaches the threshold again. In general, the watchdog application may select an appropriate operating mode based on the (UL & DL) requirements.

In the following the watchdog function and the mode selection is described in more detail. The controller, e.g., the control module 24, receives the pQoS profile and can therefore select an appropriate mode depending on the pQoS profile. The method 10 may further comprise monitoring the information related to pQoS and re-selecting the operation mode based on a monitored pQoS.

Figure 4:
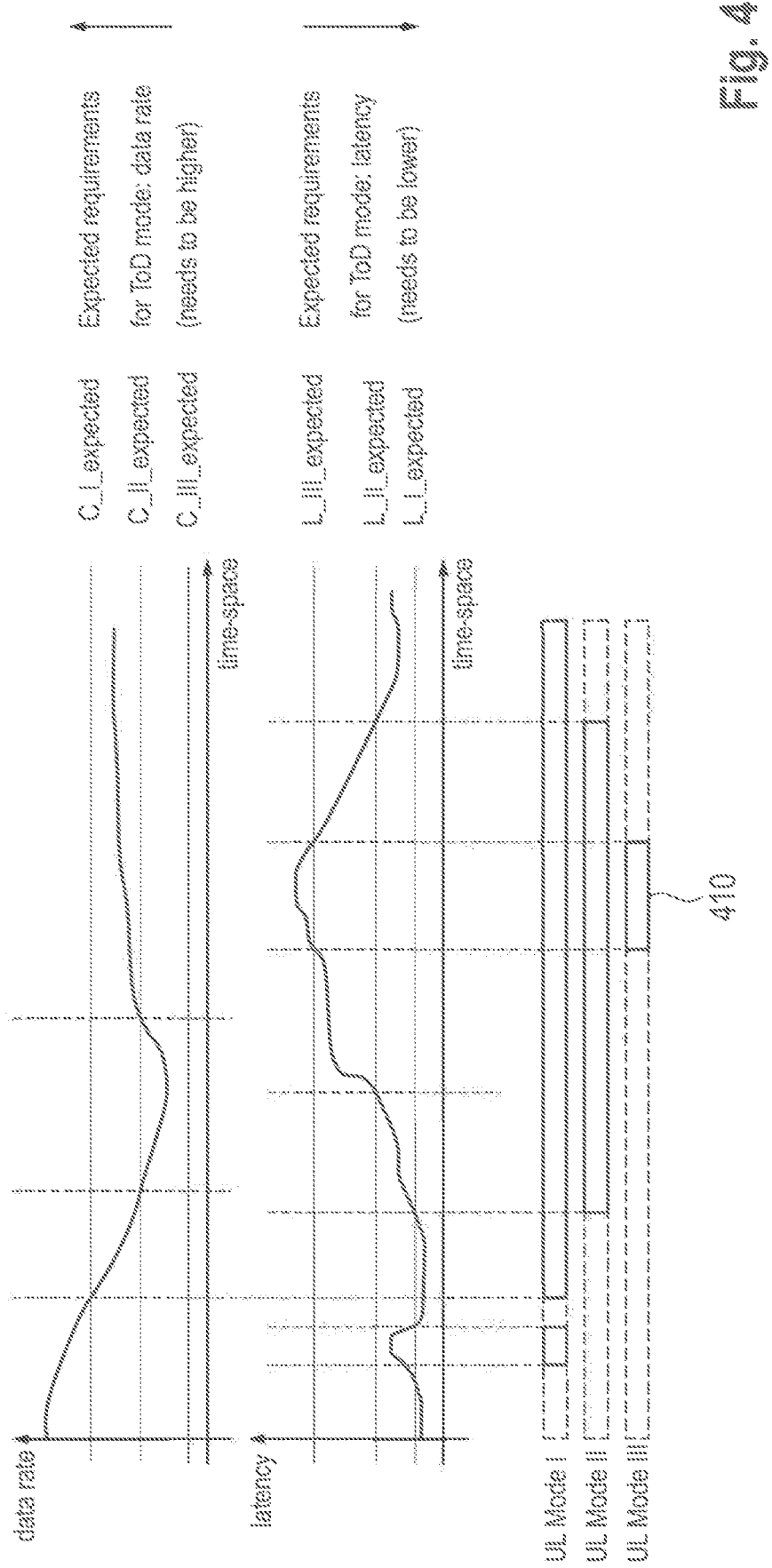
FIG. 4 illustrates data rate and latency with three distinct modes in an exemplary embodiment.

This is further illustrated in FIG. 4. FIG. 4 illustrates data rate and latency with three distinct modes in an exemplary embodiment. FIG. 4 shows data rate versus time at the top, latency versus time in the center and a binary representation of a selected UL mode at the bottom. In the data rate viewgraph at the top, three thresholds (C_I_expected, C_II_expected, C_III_expected) for the UL modes I, II, and III are shown. The requirements for Mode I are higher than for Mode II, and requirements are lowest for Mode III as detailed with respect to FIG. 3. In a similar way the latency viewgraph shows three latency thresholds (L_I_expected, L_II_expected, L_III_expected), where lowest latencies are required in Mode I and highest latencies can be tolerated in Mode III. As shown at the bottom of FIG. 4 UL Mode III is almost always supported except for the section 410, where a safety stop occurs since latency is too high. As can be further seen from FIG. 4 requirements for Mode II are only met at the beginning and end of the depicted interval, and Mode I is only supported at the beginning with a short interruption.

In exemplary embodiments the mode selection may further take into account efficiency. For example, the controller/control module 24 receives the PQoS profile and can therefore select an appropriate mode depending on the PQoS profile by reduction of a cost function. The method 10 then further comprises adapting to a selected operating mode based on a cost function. The cost function may relate to an efficiency of an operating mode. For example, the cost function relates an operating mode to fuel efficiency and comfort.

FIG. 5 shows a possible speed progress depending on a communication quality in an exemplary embodiment. FIG. 5 shows the mode justifications from the bottom of FIG. 4 at the top. At the bottom, FIG. 5 shows speed versus time, wherein the different mode intervals are also shown. The speed limits are shown by line 510, the transportation vehicle speed without the optimization are shown by line 520, and the transportation vehicle speed with optimization is shown by line 530. As can be seen from line 530 the transitions are smoother, which contributes to fuel efficiency and comfort.

As outlined above, the watchdog function may also enable a safe stop, cf. section 410 in FIG. 4. The watchdog may monitor the current communication quality and triggers a safe stop in case a threshold is infringed. Each mode has its own threshold. Therefore, if the mode is not switched quickly enough the controller triggers a safe stop. It may also use the pQoS profile to reduce the speed in advance to provide a smooth stop.

As already mentioned, in exemplary embodiments the respective methods may be implemented as computer programs or codes, which can be executed on a respective hardware. Hence, another exemplary embodiment is a computer program having a program code for performing at least one of the above methods, when the computer program is executed on a computer, a processor, or a programmable hardware component. A further exemplary embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The exemplary embodiments are also intended to cover computers programmed to perform the methods described herein or (field) programmable logic arrays ((F)PLAs) or (field) programmable gate arrays ((F)PGAs), programmed to perform the above-described methods.

The description and drawings merely illustrate the principles of the disclosure. It will thus be appreciated that those skilled in the art will be able to devise various arrangements that, although not explicitly described or shown herein, embody the principles of the disclosure and are included within its scope. Furthermore, all examples recited herein are principally intended expressly to be only for pedagogical purposes to aid the reader in understanding the principles of the disclosure and the concepts contributed to furthering the art and are to be construed as being without limitation to such specifically recited examples and conditions. Moreover, all statements herein reciting principles and disclosed embodiments, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS

- 10 method for controlling a communication link used for tele-operating a transportation vehicle
- 12 obtaining information related to a predicted quality of service, pQoS, for the communication link between the transportation vehicle and a tele-operator of the transportation vehicle
- 14 selecting an operating mode for tele-operating the transportation vehicle from a group of operating modes based on the information related to the pQoS, the group of operating modes comprising two or more operating modes differing at least in a speed limit for the transportation vehicle
- 20 apparatus for controlling a communication link used for tele-operating a transportation vehicle
- 22 one or more interfaces
- 24 control module
- 100 transportation vehicle, network component, entity
- 200 transportation vehicle
- 410 safety stop region
- 510 speed limit
- 520 speed without optimization
- 530 speed with optimization

The invention claimed is:

1. An apparatus for controlling a communication link for tele-operating a transportation vehicle by selecting an operating mode for tele-operating the transportation vehicle, the apparatus comprising:
    one or more interfaces to communicate in a communication network; and
    a control module to control the one or more interfaces, wherein the control module controls the communication link by obtaining information related to a predicted quality of service (pQoS) for the communication link between the transportation vehicle and a tele-operator of the transportation vehicle and selecting an operating mode for tele-operating the transportation vehicle from a group of operating modes based on the information related to the pQoS, the group of operating modes comprising two or more operating modes differing at least in a speed limit for the transportation vehicle.

2. The apparatus of claim 1, wherein the information related to the pQoS comprises at least latency and data rate.

3. The apparatus of claim 2, wherein the control module determines an allowable speed limit based on the information related to the pQoS and selects the operating mode based on the allowable speed limit for the transportation vehicle.

4. The apparatus of claim 1, wherein each of the operating modes is assigned to a QoS requirement.

5. The apparatus of claim 1, wherein the control module adapts to a selected operating mode based on a cost function.

6. The apparatus of claim 5, wherein the cost function relates to an efficiency of an operating mode.

7. The apparatus of claim 5, wherein the cost function relates an operating mode to fuel efficiency and comfort.

8. The apparatus of claim 1, wherein the control module monitors the information related to pQoS and re-selecting the operation mode based on a monitored pQoS.

9. The apparatus of claim 1, wherein the control module monitors a current QoS on the communication link.

10. The apparatus of claim 9, wherein the control module reselects the operating mode in response to the current QoS falling below a threshold required for a current operating mode.

11. The apparatus of claim 10, wherein the control module triggers a safety stop of the transportation vehicle in response to the current QoS falling below a safety threshold.

12. A transportation vehicle comprising the apparatus of claim 1.

13. A network component comprising the apparatus of claim 1.

14. A method for controlling a communication link for tele-operating a transportation vehicle by selecting an operating mode for tele-operating the transportation vehicle, the method comprising:
    obtaining information related to a predicted quality of service (pQoS) for the communication link between the transportation vehicle and a tele-operator of the transportation vehicle; and
    selecting an operating mode for tele-operating the transportation vehicle from a group of operating modes based on the information related to the pQoS, the group of operating modes comprising two or more operating modes differing at least in a speed limit for the transportation vehicle.

15. The method of claim 14, wherein the information related to the pQoS comprises at least latency and data rate.

16. The method of claim 15, further comprising determining an allowable speed limit based on the information related to the pQoS and selecting the operating mode based on the allowable speed limit for the transportation vehicle.

17. The method of claim 14, wherein each of the operating modes is assigned to a QoS requirement.

18. The method of claim 14, further comprising adapting to a selected operating mode based on a cost function.

19. The method of claim 18, wherein the cost function relates to an efficiency of an operating mode.

20. The method of claim 18, wherein the cost function relates an operating mode to fuel efficiency and comfort.

21. The method of claim 14, further comprising monitoring the information related to pQoS and re-selecting the operation mode based on a monitored pQoS.

22. The method of claim 14, further comprising monitoring a current QoS on the communication link.

23. The method of claim 22, further comprising reselecting the operating mode in response to the current QoS falling below a threshold required for a current operating mode.

24. The method of claim 22, further comprising triggering a safety stop of the transportation vehicle in response to the current QoS falling below a safety threshold.

25. A non-transitory computer readable medium including a computer program having a program code for performing the methods of claim 14, when the computer program is executed on a computer, a processor, or a programmable hardware component.

* * * * *